United States Patent
Fisher et al.

(10) Patent No.: US 10,406,636 B2
(45) Date of Patent: Sep. 10, 2019

(54) THERMAL INTERFACE MATERIAL AND METHOD

(71) Applicant: Purdue Research Foundation, West Lafayette, IN (US)

(72) Inventors: Timothy S Fisher, West Lafayette, IN (US); Menglong Hao, West Lafayette, IN (US); Kimberly Saviers, West Lafayette, IN (US); Rajib Paul, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 410 days.

(21) Appl. No.: 15/069,680

(22) Filed: Mar. 14, 2016

(65) Prior Publication Data

US 2016/0263708 A1 Sep. 15, 2016

Related U.S. Application Data

(60) Provisional application No. 62/132,019, filed on Mar. 12, 2015.

(51) Int. Cl.
| | |
|---|---|
| *B23K 35/00* | (2006.01) |
| *B23K 35/28* | (2006.01) |
| *B23K 35/38* | (2006.01) |
| *C01B 32/16* | (2017.01) |
| *B23K 1/002* | (2006.01) |
| *B23K 1/008* | (2006.01) |
| *B23K 1/012* | (2006.01) |
| *B23K 3/08* | (2006.01) |
| *B23K 103/00* | (2006.01) |

(52) U.S. Cl.
CPC ............ *B23K 35/001* (2013.01); *B23K 1/002* (2013.01); *B23K 1/008* (2013.01); *B23K 1/012* (2013.01); *B23K 3/087* (2013.01); *B23K 35/28* (2013.01); *B23K 35/383* (2013.01); *C01B 32/16* (2017.08); *B23K 2103/30* (2018.08)

(58) Field of Classification Search
USPC .......... 977/742, 810, 847; 423/445; 156/313
See application file for complete search history.

(56) References Cited

U.S. PATENT DOCUMENTS

2009/0200912 A1* 8/2009 Ren ................... B82Y 10/00
313/311
2010/0304101 A1* 12/2010 Lin ................... B82Y 30/00
428/212

OTHER PUBLICATIONS

Longtin et al., Active vacuum brazing of CNT films to metal substrates for superior electron field emission performance, 2015 Sci. Technology Advanced Materials, 16, Feb. 6, 2015.*
Olson, Technology and Science in Ancient Civilizations, ABC-CLIO, 2009.
Moore, L. Shi, Emerging challenges and materials for thermal management of electronics, Materials Today 2014, 17, 163-174.
(Continued)

*Primary Examiner* — Camie S Thompson
(74) *Attorney, Agent, or Firm* — Reichel Stohry Dean LLP; Natalie J. Dean; Mark C. Reichel

(57) ABSTRACT

A thermal interface material and method of making the same includes growing a carbon nanotube array on a first substrate and brazing the distal ends of the carbon nanotube array to a second substrate using a braze material. In at least one embodiment, the braze material includes active elements. The method further includes performing the brazing process in an inert or vacuum atmosphere.

18 Claims, 11 Drawing Sheets

(56) References Cited

OTHER PUBLICATIONS

Roy, et al., Dielectrics and Electrical Insulation, IEEE Transactions on 2005, 12, 629.
Prasher, Proceedings of the IEEE 2006, 94, 1571-1586.
Fisher, Thermal energy at the nanoscale, World Scientific, 2014.
Salvador, et al., Thermal to electrical energy conversion . . . , Journal of electronic materials 2013, 42, 1389-1399.
Badwal, Solid State Ionics 2001, 143, 39.
Elssner, ISIJ international 1990, 30, 1011-1032.
Singh, et al., Materials Science and Engineering: A 2007, 452, 699.
Marconnet, et al., Thermal conduction phenomena in carbon nanotubes . . . , Reviews of Modern Physics 2013, 85, 1295.
Cola, et al., Photoacoustic characterization of carbon nanotube . . . , Journal of applied physics 2007, 101, 054313.
Tong, et al., Dense vertically aligned multiwalled . . . , Components and Packaging Technologies, IEEE Transactions on 2007, 30, 92-100.
Kim, et al, Thermal transport measurements of individual multiwalled nanotubes, Physical review letters 2001, 87, 215502.
Cola, et al., International Journal of Heat and Mass Transfer 2009, 52, 3490.
Panzer, et al., Nano letters 2010, 10, 2395.
Kaur, et al., Nature communications 2014, 5.
Taphouse, et al., A pyrenylpropyl phosphonic acid surface . . . , Advanced Functional Materials 2014, 24, 465-471.
Cola, et al., "Carbon nanotube array . . . ", presented at ASME 2008 Heat Transfer Summer Conference collocated with the Fluids Engineering, Energy Sustainability . . . 2008.
Barako, "Solder-bonded carbon . . . ", presented at Thermal and Thermomechanical Phenomena in Electronic Systems (ITherm), 2012 13th IEEE Intersociety Conference on, 2012.
Singh, Nature nanotechnology 2014, 9, 384.
Wu, et al., Materials letters 2008, 62, 4486.
Zhang, et al., Materials chemistry and physics 1998, 57, 23.
Girolami, et al., Journal of the American Chemical Society 1987, 109, 1579.
Bakshi, et al., International Materials Reviews 2010, 55, 41.
Xu, et al., Enhancement of thermal interface . . . , International Journal of Heat and Mass Transfer 2006, 49, 1658-1666.
Maschman, et al., Length dependent foam-like mechanical response of axially indented vertically oriented carbon nanotube arrays, Carbon, 49 (2011) 386-397.
Raravikar, Enhanced thermal transport at covalently functionalized carbon nanotube array interfaces, Nature communications, 5 (2014).
Pop, et al., Nano letters 2006, 6, 96.
Hu, et al., Journal of Heat Transfer 2006, 12.
Mitsuo, et al., Surface and Coatings technology 1998, 103, 98.
Zhong, et al., Journal of materials processing technology 2009, 209, 2662.
Lee, Surface and Coatings Technology 2000, 133, 1.

\* cited by examiner

THERMAL INTERFACE MATERIAL AND METHOD

CROSS-REFERENCE TO RELATED APPLICATIONS

The present application claims the priority benefit of U.S. Provisional Patent Application Ser. No. 62/132,019, filed Mar. 12, 2015, the contents of which are hereby incorporated by reference in its entirety into this disclosure.

GOVERNMENT FUNDING STATEMENT

This invention was made with government support under FA9550-12-1-0037 awarded by the U.S. Air Force Office of Scientific Research and CBET1048616 awarded by the National Science Foundation. The government has certain rights in the invention.

BACKGROUND

Bridging the surfaces of two solid materials is a longstanding yet critical topic in many engineering fields. Bonding two solids at their interface is the most effective way to achieving a mechanically robust and thermally conducting interface. However, for high temperature applications, bonded interfaces between dissimilar materials experience high thermomechanical stress that degrades their performance, cyclic stability (under thermal load) and lifetime. Today, from macroscale applications in welded joints to micro and nanoscale applications in composites and nanoelectronic devices, interfaces play a crucial role in overall system performance and are often the limiting factor. In particular, miniaturization of electronic devices has placed much emphasis on development of interfaces that can sustain high thermal and electronic transport. While much effort has been directed towards improving interfacial bonding for enhanced thermal or electronic transport at or around room temperature, high temperature applications still pose a serious challenge.

For most material systems, interfacial bond strength and thermal transport are strongly correlated. For instance, load-bearing joints typically bonded firmly by welding, brazing or soldering, also yield the lowest thermal resistance (1-5 $mm^2K/W$). A weaker joint made, for example, with polymeric adhesives provides moderate thermal resistance (10-200 $mm^2K/W$). In comparison, a bare interface between two solids without any interfacial bonding has no mechanical strength and also the highest thermal resistance (>100 $mm^2K/W$). Thus, generally a strongly bonded interface has a relatively low interfacial thermal resistance. However, for applications operating under high (and often cyclic) thermal load (e.g. a thermoelectric generators, a solid oxide fuel cells and plasma-facing components in fusion reactors), a stable and strongly bonded interface is not an easy objective to achieve. The difficulty arises from the fact that strongly bonded interfaces generally also restrict relative movement of the two mating surfaces and therefore experience enormous thermomechanical stress at high temperatures, leading sometimes even to failure at the joint. This mechanical failure also then disrupts the thermal transport. The challenge for a high temperature thermal interface material thus lies in fulfilling the conflicting requirements of a strongly bonded interface that can also sustain relative motion between the surfaces.

Carbon nanotubes (CNTs) are nano-materials that are being intensely investigated as thermal interface materials due to their high thermal conductivity. In spite of the high thermal conductivity of an individual carbon nanotube (CNT), use of vertically oriented CNT arrays as a thermal interface material has been hindered by the high contact resistance at their free ends. Conventional methods to decrease the contact resistance often involve multi-step functionalization processes and suffer from poor uniformity. In addition, such methods typically require use of organic compounds or low-temperature solder, rendering the thermal interface material unsuitable for high temperature applications. Accordingly, there remains a need for further contributions in this area of technology.

BRIEF SUMMARY

At least one exemplary embodiment of the present disclosure includes a method of fabricating an interface material comprising synthesizing a plurality of carbon nanotubes on a first substrate, each of the carbon nanotubes having a proximal end affixed to the first substrate and an opposing distal end, and brazing the distal ends of the plurality of carbon nanotubes with a braze material such that the braze material wets and binds a significant portion of the carbon nanotubes. The method further includes, prior to brazing, positioning the distal ends of the plurality of carbon nanotubes adjacent a second substrate, and brazing the distal ends of the plurality of carbon nanotubes to the second substrate with the braze material such that the braze material is affixed to the second substrate and the carbon nanotubes. The method further includes, prior to brazing, positioning the braze material adjacent the distal ends of the plurality of carbon nanotubes. The method further includes, prior to brazing, apply pressure to the proximal ends of the plurality of carbon nanotubes and the opposing side of the braze material to enable close contact therebetween.

In at least one embodiment, the braze material includes titanium, zirconium or chromium. Brazing includes heating the plurality of carbon nanotubes and the braze material to the liquidus temperature of the braze material and maintaining at that temperature for about 15 minutes. The method further comprises, prior to brazing, treating the plurality of carbon nanotubes with boron-nitrate or boron nitride. The method further comprises performing the brazing process in an inert or vacuum atmosphere.

Another aspect of the present disclosure includes an interface material comprising a carbon nanotube array comprising a plurality of carbon nanotubes, each having a proximal end and a distal end, and a braze material, wherein the braze material is brazed to the carbon nanotube array such that the distal ends of the plurality of carbon nanotubes are wetted by and affixed in the braze material. The braze material is brazed to the carbon nanotube array such that the distal ends of a significant proportion of the plurality of carbon nanotubes are wetted by and affixed in the braze material. The carbon nanotube array is formed by synthesis on a growth substrate such that each of the proximal ends of the plurality of carbon nanotubes are affixed to the growth substrate.

In at least one embodiment, the braze material is a brazing alloy including an active element. In certain embodiments, the braze material is an alloy of silver, copper and titanium. In certain embodiments, the braze material is an alloy of aluminum and silicon. Each of the plurality of carbon nanotubes of the carbon nanotube array has length defined between its proximal and distal ends, the length being between about 5 and 200 microns. The average length of the plurality of carbon nanotubes of the carbon nanotube array is around 50 microns.

In at least one embodiment, the interface material further comprises a mating substrate, wherein the braze material is further brazed to the mating substrate such that the mating substrate is wetted by and affixed to the braze material. The mating substrate is selected from a group consisting of a metal, a ceramic and a cermet.

Another aspect of the present disclosure includes a device comprising a first substrate having a first temperature, a second substrate having a second temperature, and an interface material disposed between the first substrate and second substrate, the interface material comprising a nanotube array having a first side and an opposing second side defined by opposing ends of nanotubes that comprise the nanotube array, wherein the first side is affixed to the first substrate, and a braze material disposed between the opposing second side of the nanotube array and the second substrate by a brazing process, wherein the braze material bonds the second side to the second substrate, wherein the interface material enables thermal energy to flow between the first substrate and the second substrate from the higher of the first and second temperatures to the lower thereof. The nanotubes comprising the nanotube array are carbon nanotubes synthesized on the first substrate, and wherein the braze material is a braze alloy including an active element.

BRIEF DESCRIPTION OF THE DRAWINGS

The above mentioned and other features and objects of this invention, either alone or in combinations of two or more, and the manner of attaining them, will become more apparent and the invention itself will be better understood by reference to the following description of an embodiment of the invention taken in conjunction with the accompanying drawings, wherein.

Figure 1:
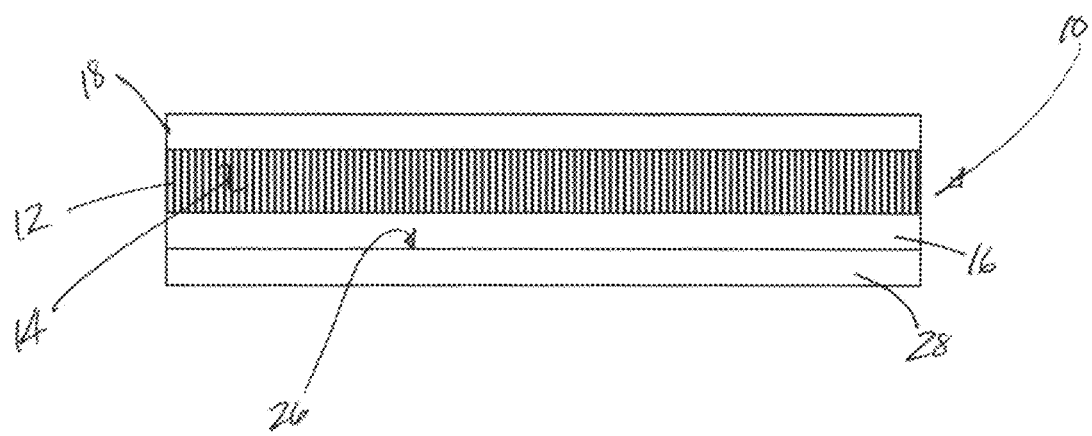
FIG. 1 shows a side view of a thermal interface material according to exemplary embodiments of the present disclosure.

Corresponding reference characters indicate corresponding parts throughout the several views. Although the drawings represent embodiments of the present invention, the drawings are not necessarily to scale and certain features may be exaggerated in order to better illustrate and explain the full scope of the present invention. The flow charts and screen shots are also representative in nature, and actual embodiments of the invention may include further features or steps not shown in the drawings. The exemplification set out herein illustrates an embodiment of the invention, in one form, and such exemplifications are not to be construed as limiting the scope of the invention in any manner.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is intended, with any additional alterations, modifications, and further applications of the principles of this disclosure being contemplated hereby as would normally occur to one skilled in the art. Accordingly, this disclosure is intended to cover alternatives, modifications, and equivalents as may be included within the spirit and scope of this disclosure as defined by the appended claims. While this technology may be illustrated and described in a preferred embodiment, the systems, methods, and techniques hereof may comprise many different configurations, forms, materials, and accessories.

The present disclosure includes a thermal interface material and a method of fabricating the same using carbon nanotubes and a brazing material. In at least one embodiment, a plurality of carbon nanotubes are configured in an array that enables both exceptional thermal conductivity and mechanical stress relief to mitigate the adverse effects of thermomechanical stress while preserving mechanical robustness and excellent heat transfer characteristics at the interface between substrates of different rates of thermal expansion. A greater than 10-fold reduction in total thermal interface resistance has been demonstrated by the disclosed thermal interface material. Moreover, the thermal interface material of the present disclosure has demonstrated relatively low thermal interface resistance even after exposure to thermal cycling and thermal shock, indicating robust thermomechanical performance. Further advantages of the thermal interface material and method of fabricating the same are disclosed herein.

A method of fabricating the thermal interface material according to the present disclosure includes a brazing process. Brazing differs from welding in that it does not involve melting the work pieces. Though similar processes, brazing differs from soldering by using higher temperatures, while often requiring much more closely fitted parts than when soldering. In many brazing processes, a braze material, generally a metal, flows into the gap between close-fitting parts by capillary action. The braze material is brought slightly above its melting (liquidus) temperature while protected by a suitable atmosphere. The braze material then flows over a base substrate to be bonded, known as wetting, and is then cooled to join the work pieces together. Brazing materials generally melt at much higher temperatures, creating bonds far stronger than those using solder material. According to the American Welding Society, if the filler metal melts below 450° C. the process being performed is soldering; above 450° C., the process is considered brazing.

Figure 2:
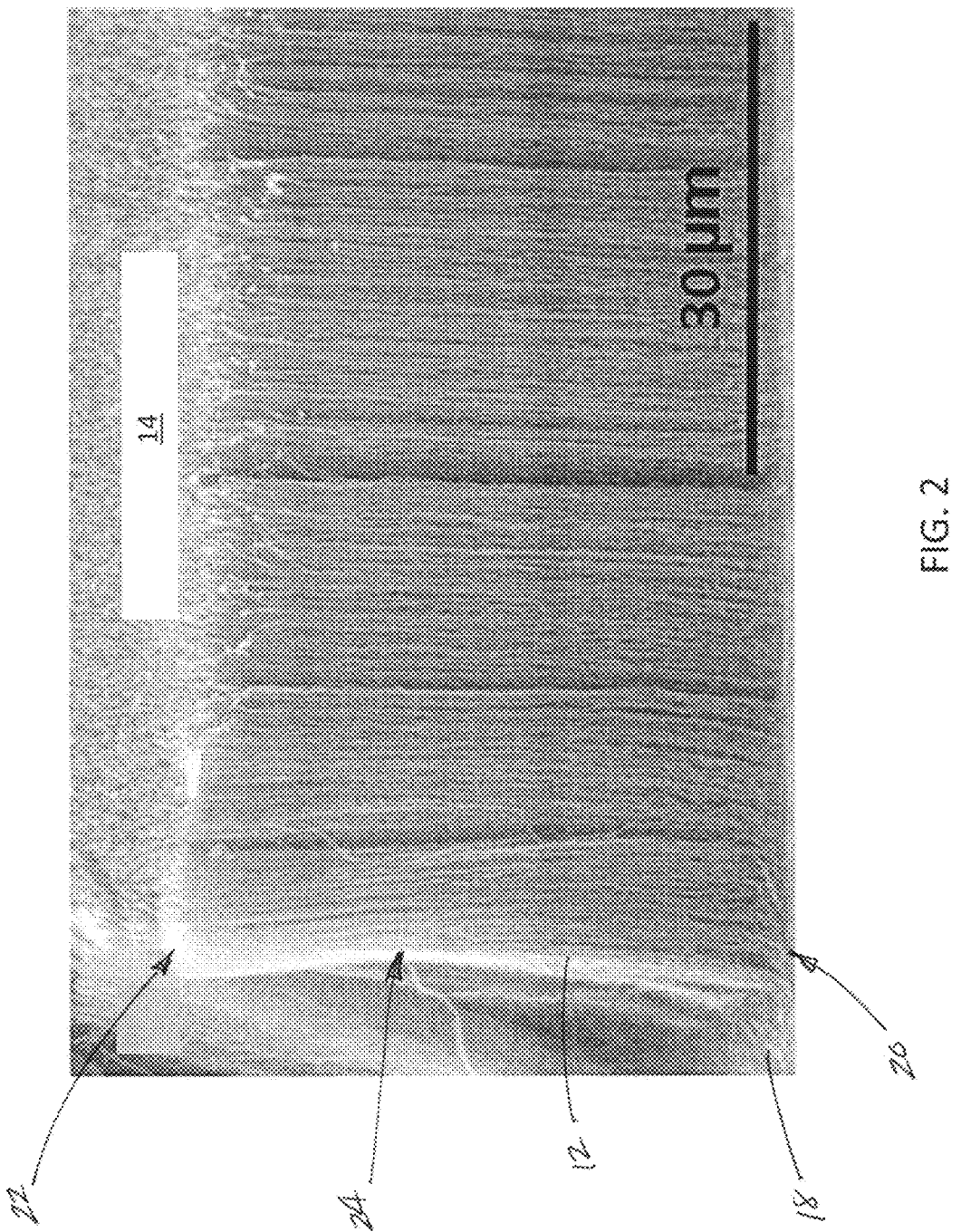
FIG. 2 shows a scanning electron microscopy (SEM) image of a carbon nanotube array according to exemplary embodiments of the present disclosure.

FIG. 1 shows an exemplary thermal interface material 10 according to embodiments of the present disclosure. As shown in FIG. 1, the thermal interface material 10 may include a plurality of carbon nanotubes (CNTs) 12 configured in a CNT array 14 and a braze material 16. The CNTs 12 may be honeycomb-like (i.e., hexagonally shaped) arrangements of carbon atoms, which enable strong carbon-to-carbon bonding, that are formed into cylindrical tubes with diameters as small as a few atoms wide and aspect ratios as high as $10^5$. In at least one embodiment, the CNT array 14 may be comprised of nanotubes of another material aside from carbon. The CNTs 12 may be produced (i.e., synthesized or grown) by any capable process including, but not limited to, arc-discharge, pyrolysis of hydrocarbons over metal nanoparticles (e.g., in chemical vapor deposition (CVD) or plasma-enhanced CVD processes), and laser vaporization of graphite targets. As shown in FIG. 2, each CNT 12 comprising the CNT array 14 includes a proximal end 20 (which may be referred to as the CNT root), a distal end 22 (which may be referred to as the CNT tip or free tip) and a length 24 defined therebetween. The lengths 24 of the CNTs 12 may be greater than zero and as long as approximately 2 millimeters (mm). In certain embodiments, lengths 24 of the CNTs 12 may be in the range of about 5 microns (μm) to about 200 μm. In at least one embodiment, the lengths 24 of the CNTs 12 may be in the range of approximately 10 μm to around 100 μm. In the exemplary embodiment shown in FIG. 2, the lengths 24 of the CNTs 12 range from around 40 to 60 μm and average approximately 50 μm. FIG. 2 is a scanning electron microscopy (SEM) image, as are FIGS. 6, 7, 8 and 15.

According to least one embodiment of the present disclosure, the CNT array 14 is synthesized or grown on a growth substrate 18, as shown in FIGS. 1 and 2. In such an embodiment, the growth substrate 18 may be any desired material that supports CNT growth, including, but not limited to, quartz, silicon, silicon carbide, silicon nitride, silica, alumina, alumino-silicate (i.e., zeolite), calcium carbonate, and magnesium oxide. In certain embodiments, the growth substrate 18 may be chosen to be operable in a given application of the thermal interface material 10, as described further herein. For example, the growth substrate 18 may be a dielectric material having a relatively low coefficient of thermal expansion (CTE), such as fused quartz, which has a CTE of about $0.5 \times 10^{-6}$ per Kelvin ($K^{-1}$). As shown in FIG. 2, the CNT array 14 may be grown substantially perpendicular to a surface of the growth substrate 18.

The braze material 16 may include any suitable brazing material. Certain braze materials may not be suitable because many metals have poor wettability with carbon nanotube material and other carbonaceous materials generally. Thus, certain braze materials may not yield satisfactory bonding to the CNT array 14. The braze material 16 may be a brazing alloy. In at least one embodiment, the braze material 16 may include active elements. In applications where the thermal interface material 10 is employed to bond to a ceramic substrate, or other substrate material not sufficiently wetted by conventional brazing materials, active elements promote reaction and wetting with the ceramic substrate. Certain active elements, such as titanium, tend to increase reactivity and considerably improve wetting with such substrates. In such embodiments, the ceramic may be wetted by the formation of an intermetallic carbide interfacial reaction product that can facilitate bond formation. However, excess amounts of active elements may compromise the fluidity and infiltration ability of the braze material 16, thereby negatively affecting the bond. Moreover, excessive carbide formation may make the interface more brittle.

In at least one embodiment of the present disclosure, the braze material 16 may be a braze alloy containing, but not limited to, copper (Cu), nickel (Ni), silver (Ag), tin (Sn), indium (In), cobalt (Co), aluminum (Al), silicon (Si), titanium (Ti), zirconium (Zr), chromium (Cr) and manganese (Mn). In certain embodiments, the braze material 16 may include titanium, chromium and/or zirconium as an active elements to facilitate wetting with the CNT array 14. In at least one embodiment, the braze material 16 may be a eutectic alloy of silver and copper (e.g., commercial available as CuSil™) having a layer titanium deposited on the side adjacent the CNT array 14 using electron beam evaporation. Alternatively, in such an embodiment, the titanium layer could be incorporated and distributed into the alloy to yield the same or similar overall composition. For example, the braze material 16 may comprise a eutectic alloy of approximately 72% Ag and 28% Cu to which 1-5% by weight of Ti is added as an active element. Such a braze material 16 may further include indium to lower the melting point of the eutectic alloy.

The brazing material 16 of the thermal interface material 10 operates to bond the CNT array 14 to a faying surface 26 of a mating substrate 28, as shown in FIG. 1. In such an embodiment, the thermal interface material 10 enables thermal conduction and a robust bond between the growth substrate 18 and mating substrate 28 with the thermal interface material 10 disposed therebetween and in thermal contact with each. Accordingly, the braze material 16 may be selected based on the composition of the growth substrate 18 and mating substrate 28. Specifically, the braze material 16 may be selected such that the liquidus temperature of the braze material 16 is below the melting point of either the growth substrate 18 or mating substrate 28. Further, the braze material 16 may be selected such that the liquidus temperature of the braze material 16 is below the melting point of any constituent of the application into which the thermal interface material 10 is employed. In certain embodiments, the braze material 16 may be selected such that the liquidus temperature of the braze material 16 is significantly below the melting point of any constituent of the application. The braze material 16 further may be selected such that the liquidus temperature of the braze material 16 is above, and in certain embodiments, significantly above, the operating temperature of the application into which the thermal interface material 10 is employed.

Figure 3:
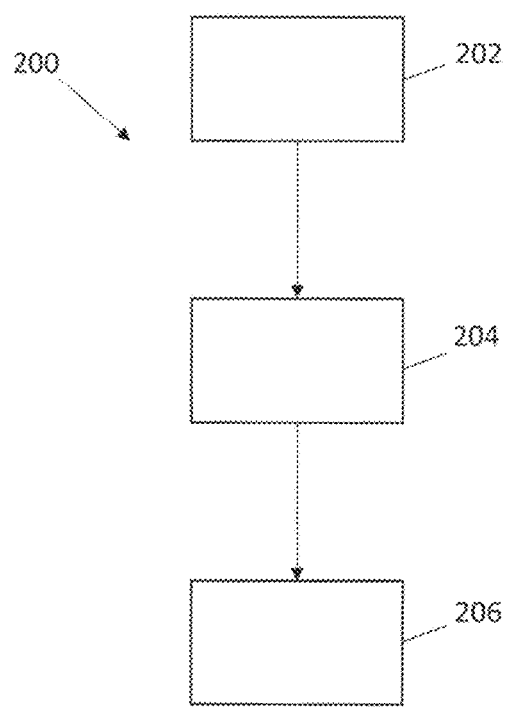
FIG. 3 shows a method of fabricating a thermal interface material according to exemplary embodiments of the present disclosure.
Figure 4:
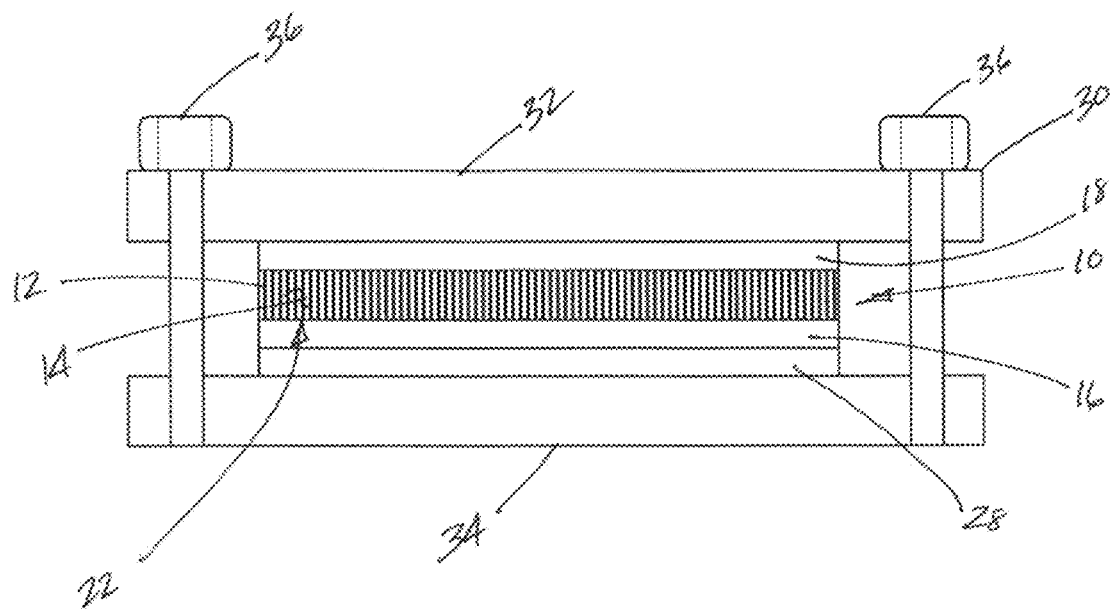
FIG. 4 shows a fabrication fixture for fabricating a thermal interface material according to exemplary embodiments of the present disclosure.

According to at least one aspect of the present disclosure, the thermal interface material 10 may be fabricated in situ to bond the growth substrate 18 and mating substrate 28 by a method 200. As shown in FIG. 3, the method 200 includes a step 202 of synthesizing the plurality of CNTs 12 on the growth substrate 18 to form the CNT array 14. The method 200 may include a step 204 of positioning the braze material 16 adjacent the mating substrate 28 and positioning the distal ends 22 of the plurality of CNTs 12 comprising the CNT array 14 adjacent the braze material 16 in a stacked configuration, as shown in FIG. 4. In such an embodiment, the braze material 16 may be configured as a layer, sheet, foil, powder or cored wire that may be placed on top of the mating substrate 28. In at least one embodiment, the step 204 may include positioning the distal ends 22 substantially in contact with the braze material 16 in the stacked configuration. In such an embodiment, the step 204 may include applying pressure to the stacked configuration to press the distal ends 22 against the braze material 16. Due to systematic variation in the step 202 of synthesizing the CNY array 14, the lengths 24 of the CNTs 12 may vary. Applying pressure in the step 204 may enable a larger proportion of the CNTs 12 of a shorter length 24 to contact the braze material 16, thereby facilitating the bond.

FIG. 4 illustrates a fabrication fixture 30 for making the thermal interface material 10, the fabrication fixture 30 having a top plate 32 and a bottom plate 34 structured to apply pressure to the stacked configuration during the step 204. Pressure may be applied by clamping the stacked configuration between the top plate 32 and bottom plate 34 and engaging compression elements 36 to compress the stacked configuration. In the embodiment shown in FIG. 4, the compression elements 36 may be bolts that pass through the top plate 32 and bottom plate 34 and are configured to reduce the gap therebetween upon turning the bolts. One having ordinary skill in the art, having the benefit of the present disclosure, may recognize that other compression elements 36 and fabrication fixtures 30 are possible and are within the scope of the present disclosure.

The method 200 may further include the step 206 of brazing the CNT array 14 to the faying surface 26 of the mating substrate 28 by reflowing the braze material 16 at an elevated temperature (referred to herein as the "brazing temperature"). The brazing temperature may be greater or equal to the liquidus temperature of the braze material 16, which is the temperature above which a material is completely liquid and maintains no crystallinity. In certain embodiments, the brazing temperature may be 50-100° C. above the liquidus of the braze material 16.

In at least one embodiment, the step 206 may be performed in an inert or vacuum atmosphere. In such an embodiment, the step 206 may be performed in a tube furnace under a nitrogen atmosphere. The step 206 may include heating the stacked configuration at a rate of about 15 degrees Celsius per minute (° C./min) to a brazing temperature of around 925° C. and maintaining the brazing temperature for about 15 minutes, after which the stacked configuration may be removed for the furnace and cooled naturally to room temperature. In certain embodiments, the step 206 may include heating the stacked configuration using any suitable heating source, such as but not limited to a torch or induction coil. Performing the brazing operation of the step 206 in a vacuum or inert atmosphere, such as nitrogen, helium and argon as non-limiting examples, may mitigate the reactivity of the active elements in the braze material 16.

The brazing temperature selected depends on the liquidus temperature of the braze material 16. The brazing temperature should be high enough to reflow the braze material 16 and bond it to the CNT array 14. The brazing temperature selected may further depend on a melting temperature of the desired mating substrate 28 and growth substrate 18. For example, the brazing temperature should not approach the melting point of either the growth substrate 18 or mating substrate 28.

Figure 5:
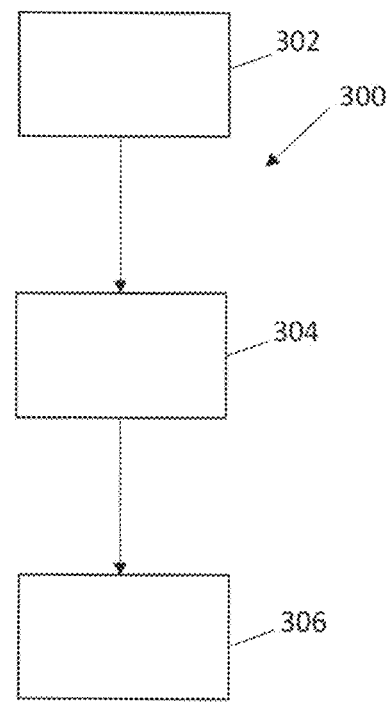
FIG. 5 shows a method of fabricating a thermal interface material according to exemplary embodiments of the present disclosure.

According to at least one aspect of the present disclosure, the thermal interface material 10 may be fabricated in situ to bond the growth substrate 18 and mating substrate 28 by a method 300. As shown in FIG. 5, the method 300 includes a step 302 of synthesizing the plurality of CNTs 12 on the growth substrate 18 to form the CNT array 14. The method 300 may include a step 304 of positioning the mating substrate 28 adjacent the distal ends 22 of the plurality of CNTs 12 comprising the CNT array 14.

In certain embodiments, the mating substrate 28 may be disposed adjacent the CNT array 14 such that a relatively small gap is maintained therebetween, the gap sufficient to enable the braze material 16 in a molten state to be drawn or distributed into the gap by capillary action. In at least one embodiment, the step 304 may include positioning the distal ends 22 substantially in contact with the mating substrate 28 in the stacked configuration. In such an embodiment, the step 304 may include applying pressure to the stacked configuration to press the distal ends 22 against the mating substrate 28. Applying pressure in the step 304 may enable CNTs 12 of a shorter length 24 to contact the mating substrate 28, thereby facilitating the bond. In such an embodiment, the gaps between the CNTs 12 of the CNT array 14 and the variation in the lengths 24 of the CNTs 12 may provide sufficient gaps for the braze material 16 in a molten state to flow therebetween by capillary action. The sufficiency of the gap may depend on various factors, including mating substrate and braze material composition, and the brazing atmosphere.

The method 300 may further include the step 306 of brazing the CNT array 14 to the faying surface 26 of the mating substrate 28 by flowing the brazing material 16 between the CNTs 12 of the CNT array 14 and the mating surface 28 at an elevated temperature. The step 306 may include heating the braze material 16 to the brazing temperature and bringing the molten braze material 16 in contact with the interface between the faying surface 26 and CNT array 14, such that the braze material 16 is drawn into the gap between the CNT array 14 and the mating substrate 28. In at least one embodiment, the step 306 may be performed in an inert or vacuum atmosphere. In such an embodiment, the step 306 may be performed in a tube furnace under a nitrogen atmosphere. The step 306 may include heating the stacked configuration at a rate of about 15 degrees Celsius per minute (° C./min) to a brazing temperature of around 925° C. and maintaining the brazing temperature for about 15 minutes, after which the stacked configuration may be removed for the furnace and cooled naturally to room temperature. In certain embodiments, the step 306 may include heating the stacked configuration using any suitable heating source, such as but not limited to a torch or induction coil. Performing the brazing operation of the step 306 in a vacuum or inert atmosphere, such as nitrogen, helium and argon as non-limiting examples, may mitigate the reactivity of the active elements in the braze material 16.

In at least one embodiment of the present disclosure, the step 202 of the method 200 and the step 302 of the method 300 may include synthesizing the carbon nanotubes in a direction normal to the growth substrate 18 using a microwave plasma chemical vapor deposition (MPCVD) system. In such an embodiment, the growth substrate 18 may be a quartz substrate approximately 10 mm×10 mm×0.5 mm thick. The growth substrate 18 may be cleaned, then a tri-layer catalyst, which consists of 30 nm Ti, 10 nm Al and 5 nm Fe, may be deposited on the growth substrate 18 using electron beam evaporation. The growth substrate 18 with catalyst may then be placed in a MPCVD chamber and heated to around 800° C. in a nitrogen atmosphere. Once reaching 800° C., the flow of nitrogen may be stopped, and CNT synthesis may be initiated in mixture of hydrogen at about 50 standard cubic centimeters per minute (sccm) and methane at about 10 sccm at a total pressure of 10 Torr and a plasma power of 300 W. After about 10 minutes of continuous growth, vertically oriented CNT arrays of approximately 60 μm height are obtained. A SEM image of a typically array is shown in FIG. 2.

In certain embodiments, the step 204 of the method 200 and the step 304 of the method 300 may include pretreating the CNT array 14 to improve the temperature resistance and increase the wettability of the CNT array 14. Such pretreatments may include boron-nitrate, or boron nitride, oxygen plasma treatment, in-situ defect control in growth process and microwave treatment, among others.

Exemplary embodiments of the thermal interface material 10 were fabricated using the method 200 and evaluated as described in the following experiments.

Experiment 1: Qualitative Peel Test

Figure 6:
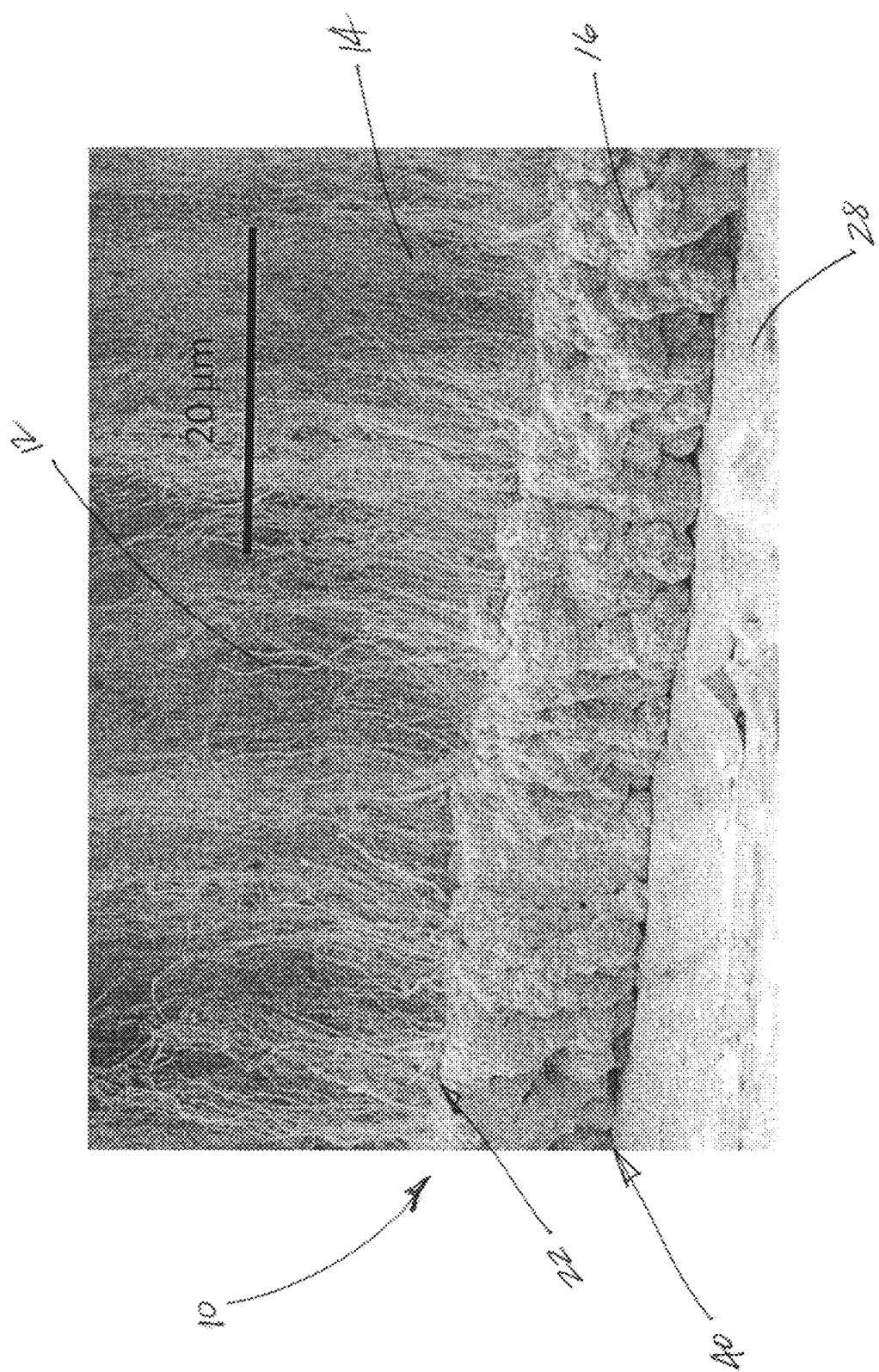
FIGS. 6-8 show SEM images of a thermal interface material according to exemplary embodiments of the present disclosure.

FIG. 2 shows the CNT array 14 grown by the method 200 on a growth substrate 18 comprised of quartz before the brazing process. The CNT array 14 had an approximate average height of 50 μm as indicated by the scale shown in the FIG. 2. FIG. 6 shows a magnified view of the thermal interface material 10, including the CNT array 14 and the braze material 16, employed in a bond joint 40 between the growth substrate 18 (not shown in FIG. 6) and the mating substrate 28 as fabricated using the method 200. In the exemplary embodiment of FIG. 6, the mating substrate 28 was a metal, specifically copper. As is apparent from FIG. 6, the height variation of individual CNTs 12, and the potential poor contact to the braze material 16, is largely mitigated as the braze material 16 practically penetrates to nearly all the CNT tips 22 in the CNT array 14, leaving behind very few dangling short CNT tips 22.

Figure 7:
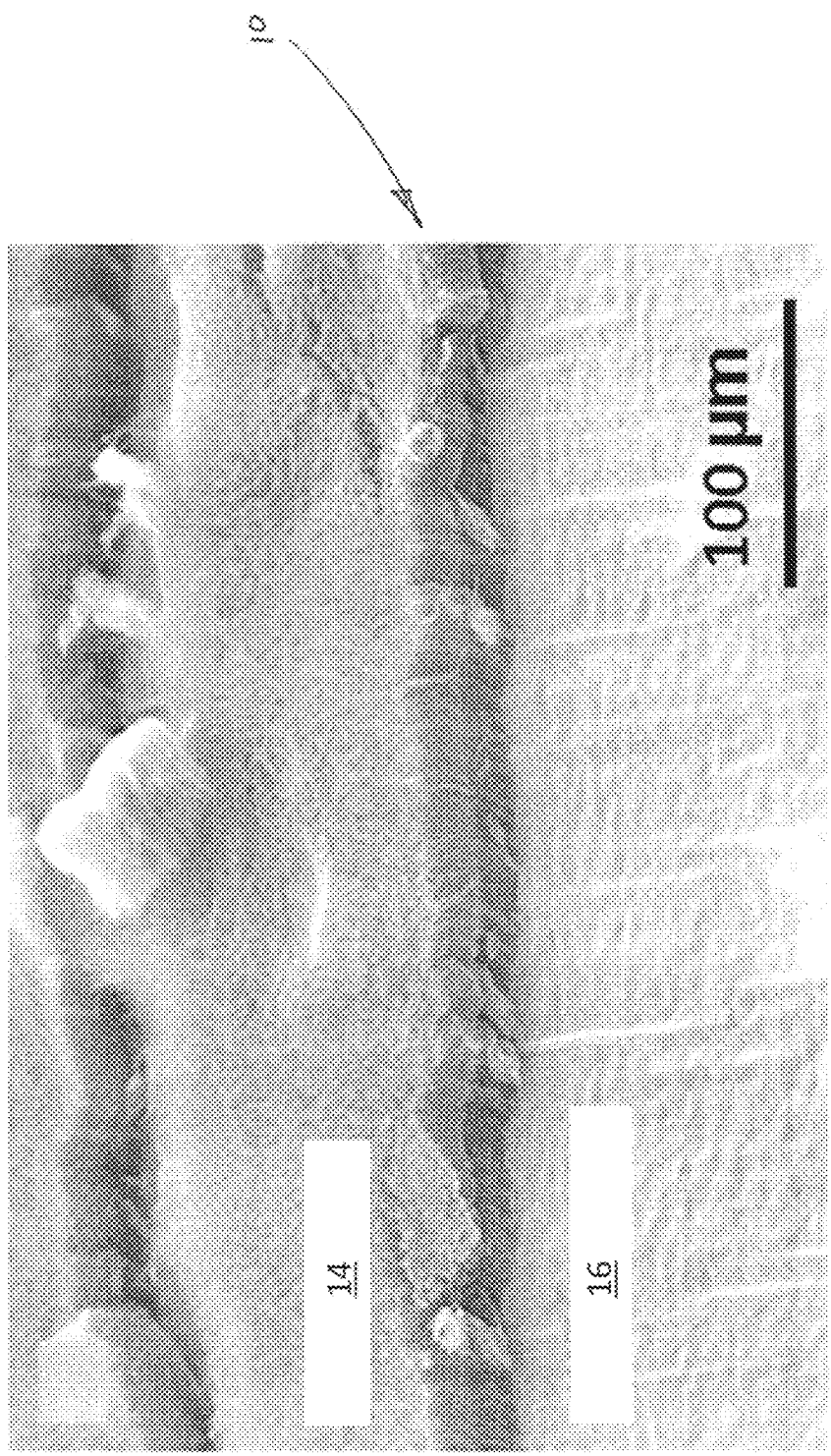
Figure 8:
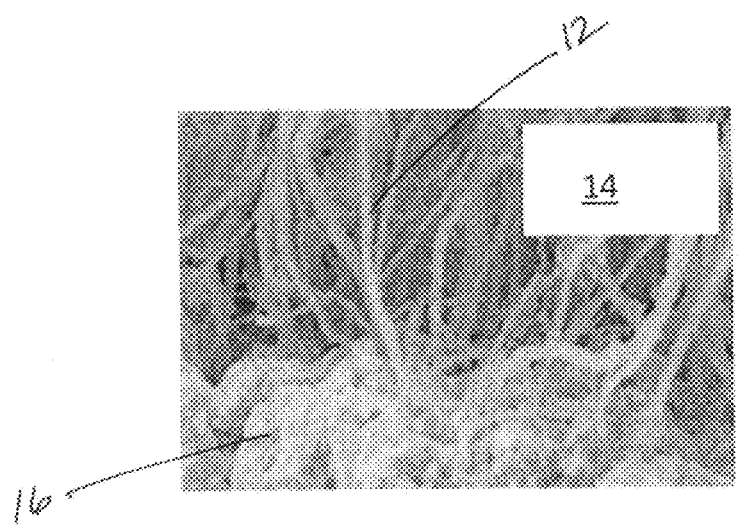

FIG. 7 shows a magnified view of the thermal interface material 10 after the growth substrate 18 had been manually peeled away from the CNT array 14 to reveal the interface between the CNT array 14 and the braze material 16. As is apparent from FIG. 7, virtually all of the CNTs 12 of the CNT array 14 remain affixed to the braze material 16 instead of the growth substrate 18, indicating a stronger bond at the CNT/braze interface when compared to the bond at the CNT/growth substrate interface. FIG. 8 shows a magnified view of the CNT/braze interface with individual CNTs 12 of the CNT array 14 embedded in the braze material 16 and not merely in casual contact with the braze material 16 after brazing, which further indicates a robust bond therebetween.

Experiment 2: Spectroscopy

Figure 9:
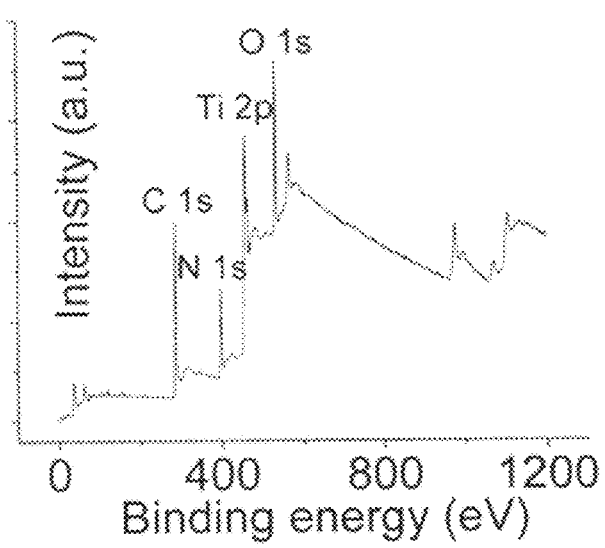
FIG. 9 is a survey spectrum from a X-ray photoelectron spectroscopy (XPS) scan of a thermal interface material according to exemplary embodiments of the present disclosure.
Figure 10:
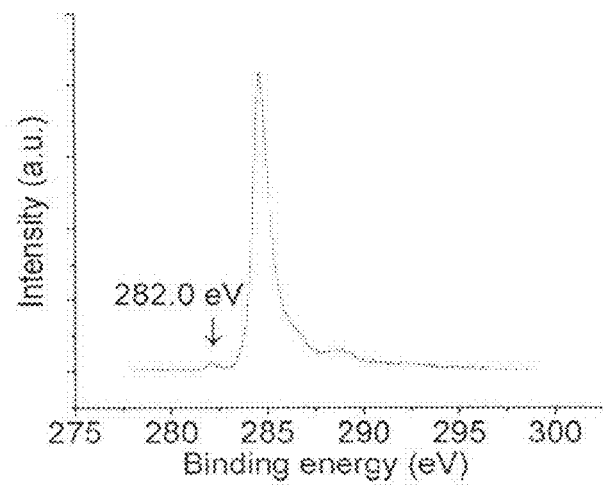
FIG. 10 is a C1s spectrum from a XPS scan of a thermal interface material according to exemplary embodiments of the present disclosure.

To understand the nature of the bond between the CNT array 14 and braze material 16, X-ray photoelectron spectroscopy (XPS) was performed on the CNT/braze interface region of sample fabricated by the method 200. A survey spectrum is shown in FIG. 9. A high resolution C1s spectrum is shown in FIG. 10. As shown in FIG. 10, besides the typical multiwall CNT main peak at approximately 285 electron-Volts (eV) and high-energy tail indicating various functional groups (e.g., —COO, C—O, C=O, etc.), a small but clear peak repeatedly occurred at 282.0 eV. This binding energy agrees well with values in the literature for titanium carbide ($TiC_x$) formation. Additional evidence of Ti—C bonds can be found in the Ti spectrum as well.

Figure 11:
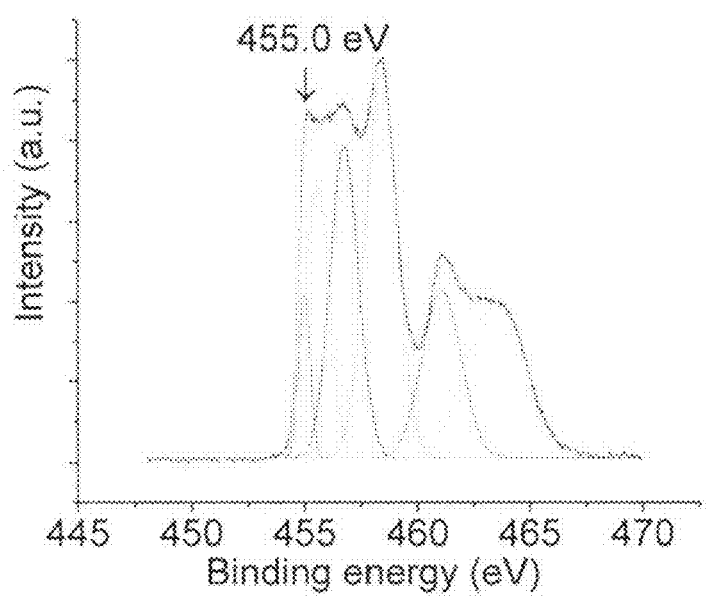
FIG. 11 shows Ti 2p spectra from a XPS scan of a thermal interface material according to exemplary embodiments of the present disclosure.

FIG. 11 shows high resolution Ti 2p spectra indicating complex bonding between Ti and other elements. Due to the high reactivity of Ti with multiple other species including N and O, the Ti spectrum is rather complex. Nevertheless, a peak at 455.0 eV can be identified, which is characteristic of Ti—C bond. It is generally known that most metals have poor wettability with CNTs and other carbonaceous materials in general. However, FIG. 11 suggests the formation of a carbide interphase formed between the CNT array 14 and the active elements (i.e., titanium in this embodiment) in the braze material 16. The carbide interphase promotes wetting between the braze material 16 and the CNT array 14, thereby improving the quality of the bond.

Experiment 3: Thermal Characterization

Measurements of thermal transport characteristics of samples of the thermal interface material 10 were made using a photoacoustic test setup. A pulsed laser was used as the heat source. The thermal properties of the sample were evaluated by monitoring the surface temperature modulation of the sample at various laser frequencies. The thermal interface material 10 samples were made using a quartz growth substrate 18 and a copper mating substrate 28.

Figure 12:
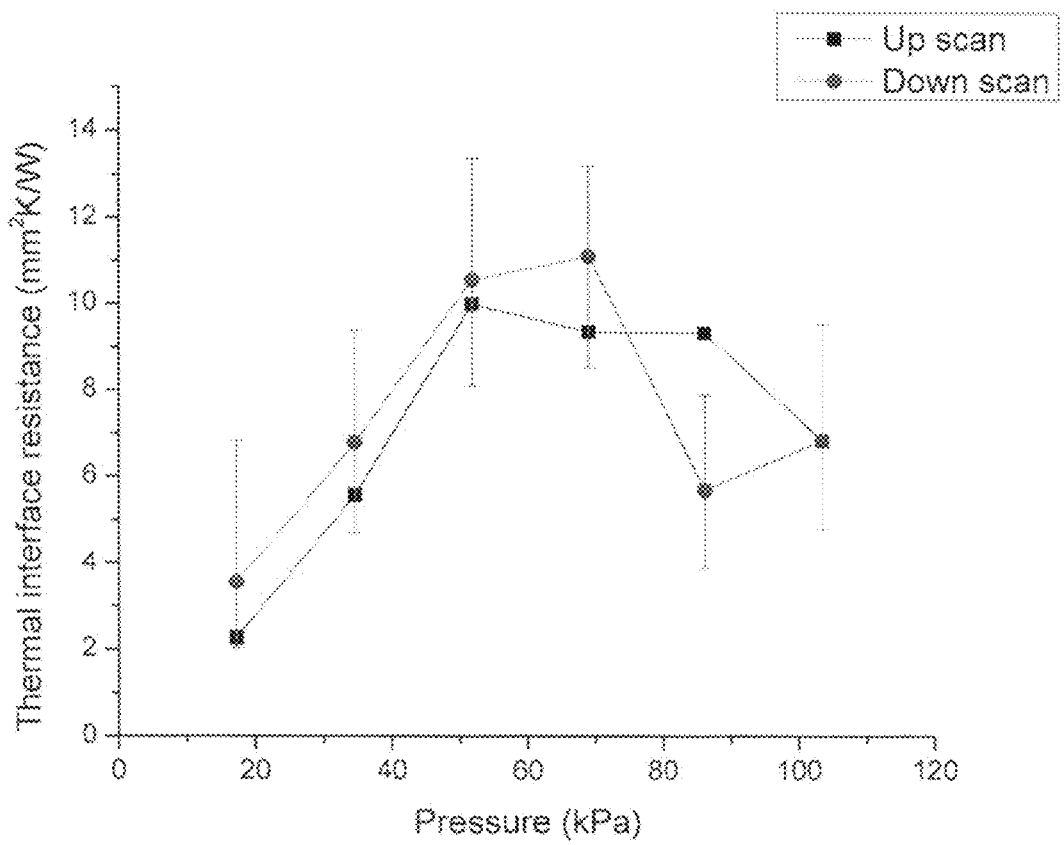
FIG. 12 shows a graph of thermal interface resistance (measured in square millimeters-Kelvin per Watt) versus pressure (measured in kilopascals) for samples of a thermal interface material according to exemplary embodiments of the present disclosure.

FIG. 12 shows the thermal interface resistance (TIR) of the thermal interface material 10 at various pressures. The TIR of the thermal interface material 10 was measured in square millimeters-Kelvin per Watt ($mm^2$-K/W) as pressure was increased upon the test sample (labeled "Up scan" in FIG. 12) and again as the pressure was reduce upon the test sample (labeled "Down" scan). The error bars were calculated by assuming a phase measurement uncertainty of 0.5 degree and are shown only for the "Down scan" for visual clarity. The test samples included a quartz growth substrate 18 with the thermal interface material 10, thus the measurements included the bulk thermal resistance of the CNT array 14 and the contact resistance at the two ends of the CNT array 14 (i.e., both the CNT/braze and CNT/substrate interfaces). In a separate experiment, the bulk resistance of the braze material 16 and its interface with a copper mating substrate 28 was found to contribute only approximately 1-2 $mm^2K/W$ to the overall resistance the thermal interface material 10 in an exemplary embodiment.

As shown in FIG. 12, thermal interface resistance (TIR) is a function of pressure, although the dependence is rather weak when compared with other soft interface materials such as bare CNT arrays (i.e., no braze material included). FIG. 12 indicates a primarily positive pressure dependence, which is contrary to any other reported interface materials to the knowledge of the inventors. For bare CNT arrays as well as many other types of thermal interface materials, the TIR value is often a strong function of pressure because higher pressure typically increases the real contact area between substrates. However, after brazing the TIR of the thermal interface material 10 samples is seen to be much less dependent on pressure. Without being bound to a particular theory, the demonstrated positive pressure dependence can be explained by the fact that CNT tips 22 have been firmly anchored to the braze material 16, as shown in FIGS. 6 and 8. Because most CNT free tips 22 have formed chemical bonds with the braze material 16 during brazing, pressure is not required to maintain high contact area and low TIR. Therefore, the conventional hypothesis of increasing real contact area with increasing pressure, which is the generally accepted mechanism behind the typical negative pressure dependence of TIR, has little or no effect in the thermal interface material 10. The demonstrated weak and slightly positive pressure dependence is a favorable characteristic for many, especially high temperature, applications. The high and uniform compressive load required for conventional interface materials can sometimes be harmful to the mated components or, at elevated temperatures, simply very difficult to maintain due to thermal fatigue of load-applying structures. The pressure-independence of the thermal interface material 10 is a desirable attribute for most thermal interface applications where other components in the system may be vulnerable to high mechanical load.

Referring to FIG. 12, at 17.2 kilopascals (kPa), the lowest pressure tested, the TIR reaches as low as 2.26 mm$^2$K/W. This value indicates a more than ten-fold reduction from that of a control (i.e., a bare CNT array of the same length), as shown and described with respect to FIG. 14. Since a considerable portion of this resistance can be attributed to the 50 µm long CNT array 14, one may conclude that the contact resistance at the CNT tips 22 has been reduced by a factor much greater than ten. If one assumes negligible contact resistance on the proximal end 20 and distal end 22 of the CNT array 14 and a CNT volume fraction of 1%, which is a typical value for conventional CNT arrays, the effective thermal conductivity of individual CNTs 12 in the CNT array 14 could be estimated, considering the error bars, as 920-2280 Watts per meter–Kelvin (Wm$^{-1}$K$^{-1}$). This estimated range is toward the low end of the directly measured range of CNT thermal conductivity (1000-3000 Wm$^{-1}$K$^{-1}$) of conventional CNT arrays in the literature. The established range may stem from the relatively high defect density caused by plasma growth environments and the fact that the CNTs are typically not perfectly straight.

Referring to FIG. 12, at higher applied pressures, the TIR first rises to 10.0 mm$^2$K/W at 51.7 kPa and then stabilizes. The measured increase could be attributed to bending and buckling of the CNTs 12, which could lead to increased phonon scattering and hence a reduced mean free path and could therefore lower the thermal conductivity of the CNT array 14. The decreasing pressure scan (i.e., the "Down scan") demonstrated a slight hysteresis at higher applied pressures. With further decreasing pressure, the measured TIR follows the trend in the Up scan fairly closely. At all pressure conditions that were tested, the TIR remains below 12 mm$^2$K/W, which compares well with conventional mechanically compliant interface materials.

Experiment 4: Thermomechanical Robustness

Figure 13:
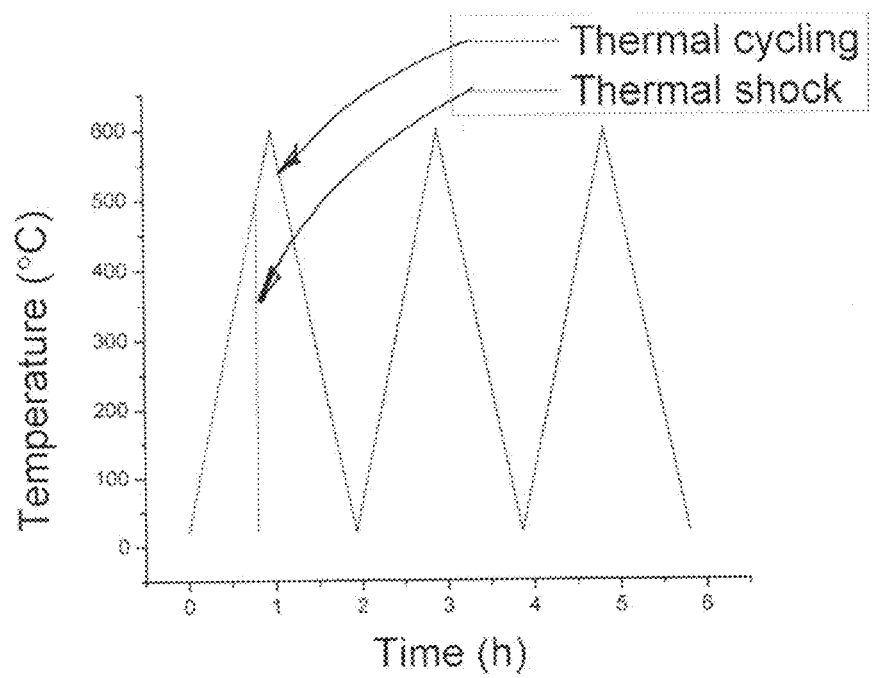
FIG. 13 shows a graphical representation of environmental exposure temperature profiles as temperature (measure din the Celsius) versus time (measured in hours) used to evaluate samples of a thermal interface material according to exemplary embodiments of the present disclosure.

The reliability of the thermal interface material 10 was evaluated before and after exposure to the thermomechanically harsh environments shown in FIG. 13. Samples of the thermal interface material 10 were subjected to a thermocycle test in which the samples were repeatedly heated and cooled between room temperature and 600° C. at a heating rate of 10° C./min. Three thermocycles were performed on each sample. Further, a separate set of samples were subjected to a thermal shock test in which the samples were heated up to 500° C. in a nitrogen atmosphere at around 10° C./min, promptly removed from the furnace, and immediately dropped into water at room temperature. All thermal measurements were carried out at an applied pressure of 34.5 kPa. The TIR of all samples was measured before each environmental exposure test, and these "pre-exposure" results are labeled "CNT/Braze" in FIG. 14.

Figure 14:
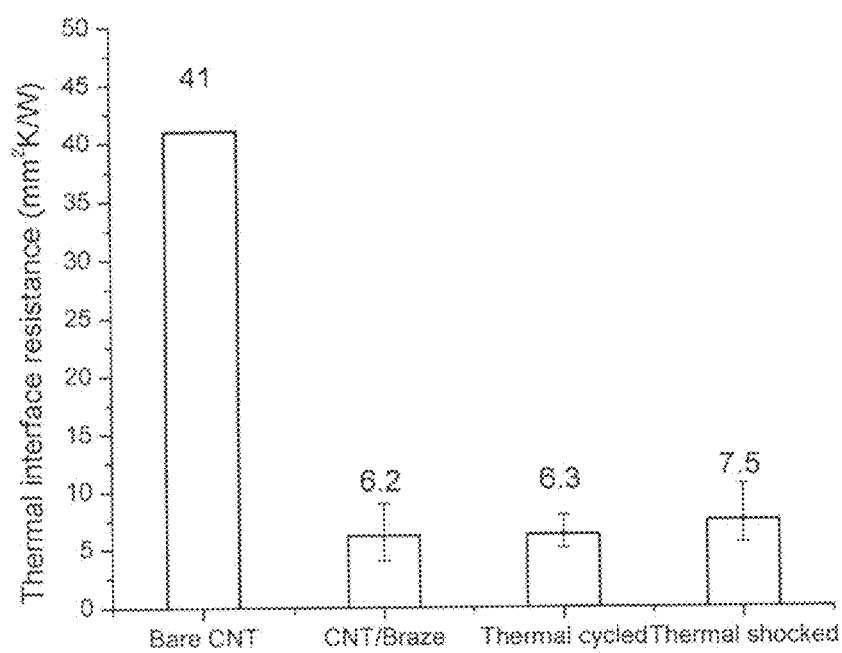
FIG. 14 shows a chart of thermal interface resistance (measured in square millimeters-Kelvin per Watt) before and after environmental exposure for samples of a thermal interface material according to exemplary embodiments of the present disclosure.

As shown in FIG. 14, samples of the thermal interface material 10 subjected to both the thermocycle and thermal shock tests exhibited only minor, if any, effect on the TIR of the samples. TIR remains low after both tests. After both tests, the samples maintained mechanical integrity relative to the pre-exposure results. As a control sample, separate quartz and copper substrates were brazed together using the same braze material 16 but without a CNT array. The control sample was subjected to the thermal shock test and the two substrates readily delaminated afterward. The TIR of the control sample is labeled "Bare CNT" in FIG. 14.

Preserving high interfacial thermal conductance under cyclic thermal load has been a major obstacle to thermal transport in high temperature applications such as thermoelectric devices. The difficulty arises from interfacial failure due to thermomechanical stresses at the interface. The thermal interface material 10 provides an interface with excellent thermal and mechanical stability even when subjected to severe thermal loading. The thermal interface material 10 significantly reduces the overall thermal resistance and enables an expanded operational temperature range over conventional thermal interface materials. Generally, thermomechanical stress in a thermal interface material is in the lateral direction, whereas in many applications the heat transfer of concern is in the normal direction. The thermal interface material 10 takes advantage of the relatively high anisotropicity of the CNT array 14 and the thermal expansion characteristics of the braze material 16 to create an interface material that is thermally conductive as well as thermomechanically robust.

The thermal interface material 10 may be employed in many applications. Many energy conversion devices, such as high temperature thermoelectric generators, solid oxide fuel cells, and plasma-facing components in fusion reactors, can benefit from the thermal interface material 10. The thermal interface material 10 may be employed in applications to reduce interfacial transport in devices operating under large thermal loads. The maximum operating temperature of the thermal interface material 10 may be limited by the liquidus temperature of the braze material 16, which may be in the range of 600-900° C. and further depends on the extent of carbide formation between the active elements and carbon in the CNT array 14. A safety margin may be kept to avoid local liquidation of the braze material 16 and excessive oxidation, particularly in applications where the thermal interface material 10 is exposed to high temperature ambient air. Accordingly, the maximum operating temperature of the thermal interface material 10 may be extended by selection of a higher temperature braze material 16. For example, the braze alloy marketed under the trade name Ticuni™ has a liquidus temperature of around 960° C.

The maximum operating temperature of the thermal interface material 10 may exceed that of the substrates used in a given application. For example, in particular, the mating substrate 28 may be any desired substrate and may be selected according to the application into which the thermal interface material 10 is employed. By way of non-limiting example, the mating substrate 28 may be a metal, a ceramic, a cermet composite of ceramic and metallic compounds, or dielectric material. Where the mating substrate 28 is a relatively low melt temperature material, such as aluminum or magnesium, the braze material 16 may be selected on the basis of having a relatively low liquidus temperature, thus reducing the brazing temperature safely below the melt temperature of the mating substrate 28. For instance, silumin alloys may yield good bonding characteristics with the CNT array 14 at a brazing temperature around 600° C.

Figure 15:
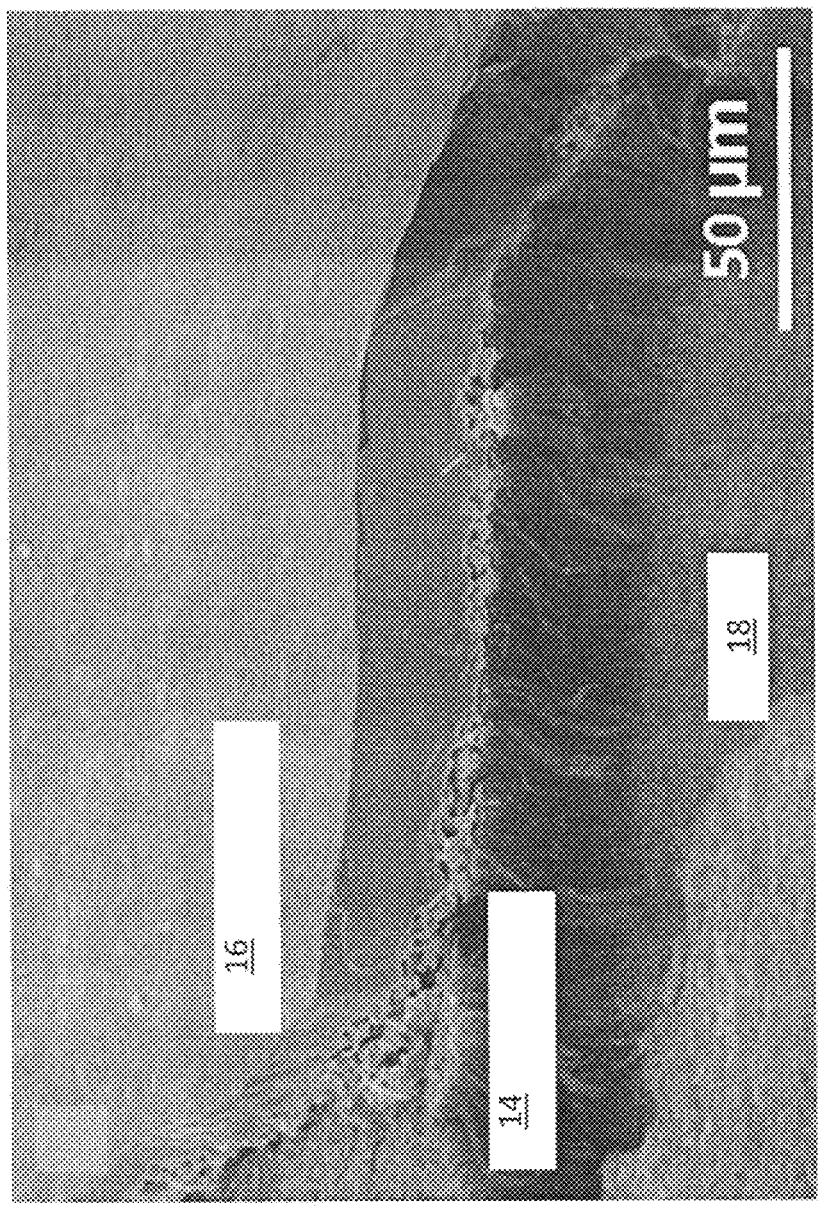
FIG. 15 shows an SEM image of a thermal interface material according to exemplary embodiments of the present disclosure.

In certain applications, the thermal interface material 10 may be employed to provide a thermal and mechanical connection between two insulators (e.g. a ceramic to ceramic interface). FIG. 15 shows a quartz-alumina interface after manual separation. In the embodiment shown in FIG. 15, the mating surface 28 is alumina, which has been peeled away from the braze material 16. The growth substrate 18 is quartz. Separation is seen between all layer interfaces. Even though the sample separated at both the braze/alumina as well as CNT/quartz interface, for the most part the CNT/braze interface stayed intact indicating a good bonding between CNT and the braze layer. The delamination at the braze/alumina interface could be attributed to residual thermal stress due to the CTE-mismatch between the braze material (in this embodiment, $18.5 \times 10^{-6}$ K$^{-1}$) and alumina (in this embodiment, $5.4 \times 10^{-6}$ K$^{-1}$). In at least one embodiment of the present disclosure, the thermal interface material 10 may be structured such that substrates with very different CTEs are separated by the CNT array 14. For example, in the case of a quartz-Cu joint, the braze material 16 should be placed on the Cu side (i.e., the mating substrate 28) otherwise a braze-quartz interface would be vulnerable to thermomechanical failure.

As noted herein, the thermal interface material 10 may be employed in thermoelectric generators applications, which raise challenges difficult to address with conventional technologies. In thermoelectric generators, different functional layers are often made of drastically dissimilar materials, such as a metal heat exchanger and ceramic insulator. Improved thermal transport between adjacent layers increases energy conversion efficiency. Directly brazing metal and ceramic layers is very difficult as a result of their very different thermal expansion behaviors (i.e., significantly different CTEs). Even if successfully fabricated, a brazed joint is often vulnerable to the thermal cycling conditions of thermoelectric generators, as it creates cyclic thermomechanical stress, which is detrimental to joint integrity. Further, due to the high temperature working environment (e.g., greater than 600° C. for thermoelectric generators in certain automotive waste heat recovery applications), conventional thermal interface materials are not suitable because they tend to use organic compounds that degrade as such temperatures. As described herein, the thermal interface material 10 addresses these shortcomings of conventional thermal interface materials and, thus, is well-suited for thermoelectric generators applications.

While various embodiments of a thermal interface material and methods of making the same according to the present disclosure have been described as having an illustrative design, the present disclosure may be further modified within the spirit and scope of this disclosure. The present application is therefore intended to cover any variations, uses, or adaptations of the invention using its general principles. Further, the present application is intended to cover such departures from the present disclosure as come within known or customary practice in the art to which this invention pertains.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

What is claimed is:

1. A method of fabricating an interface material comprising:
   synthesizing a plurality of carbon nanotubes on a first substrate, each of the carbon nanotubes having a proximal end affixed to the first substrate and an opposing distal end; and
   brazing the distal ends of the plurality of carbon nanotubes with a braze material is an alloy of aluminum and silicon such that the braze material wets and binds a significant portion of the carbon nanotubes.

2. The method of claim 1, the method further comprising:
   prior to brazing, positioning the distal ends of the plurality of carbon nanotubes adjacent a second substrate; and
   brazing the distal ends of the plurality of carbon nanotubes to the second substrate with the braze material such that the braze material is affixed to the second substrate and the carbon nanotubes.

3. The method of claim 1, the method further comprising:
   prior to brazing, positioning the braze material adjacent the distal ends of the plurality of carbon nanotubes.

4. The method of claim 1, the method further comprising:
   prior to brazing, applying pressure to the proximal ends of the plurality of carbon nanotubes and the opposing side of the braze material to enable close contact therebetween.

5. The method of claim 1, wherein the braze material includes titanium, zirconium or chromium.

6. The method of claim 1, wherein brazing includes heating the plurality of carbon nanotubes and the braze material to the liquidus temperature of the braze material and maintaining at that temperature for about 15 minutes.

7. The method of claim 1, the method further comprising:
   prior to brazing, treating the plurality of carbon nanotubes with boron-nitrate or boron nitride.

8. The method of claim 1, wherein the brazing process is performed in an inert or vacuum atmosphere.

9. An interface material comprising:
   a carbon nanotube array comprising a plurality of carbon nanotubes, each having a proximal end and a distal end; and
   a braze material that is an alloy of aluminum and silicon, wherein the braze material is brazed to the carbon nanotube array such that the distal ends of the plurality of carbon nanotubes are wetted by and affixed in the braze material.

10. The interface material of claim 9, wherein the braze material is brazed to the carbon nanotube array such that the distal ends of a significant proportion of the plurality of carbon nanotubes are wetted by and affixed in the braze material.

11. The interface material of claim 9, wherein the carbon nanotube array is formed by synthesis on a growth substrate such that each of the proximal ends of the plurality of carbon nanotubes are affixed to the growth substrate.

12. The interface material of claim 9, wherein each of the plurality of carbon nanotubes of the carbon nanotube array has length defined between its proximal and distal ends, the length being between about 5 and 200 microns.

13. The interface material of claim 12, wherein the average length of the plurality of carbon nanotubes of the carbon nanotube array is around 50 microns.

14. The interface material of claim 9, the interface material further comprising:

a mating substrate, wherein the braze material is further brazed to the mating substrate such that the mating substrate is wetted by and affixed to the braze material.

15. The interface material of claim 14, wherein the mating substrate is selected from a group consisting of a metal, a ceramic and a cermet.

16. The interface material of claim 9, wherein at least a portion of the carbon nanotube array comprises one or more nanotubes that do not comprise carbon.

17. A device comprising:
a first substrate having a first temperature;
a second substrate having a second temperature; and
an interface material disposed between the first substrate and second substrate, the interface material comprising:
a nanotube array having a first side and an opposing second side defined by opposing ends of nanotubes that comprise the nanotube array, wherein the first side is affixed to the first substrate, and
a braze material that is an alloy of aluminum and silicon disposed between the opposing second side of the nanotube array and the second substrate by a brazing process, wherein the braze material bonds the second side to the second substrate,
wherein the interface material enables thermal energy to flow between the first substrate and the second substrate from the higher of the first and second temperatures to the lower thereof.

18. The device of claim 17, wherein the nanotubes comprising the nanotube array are carbon nanotubes synthesized on the first substrate, and wherein the alloy of the braze material is a braze alloy including an active element.

* * * * *